(12) United States Patent
Cohen et al.

(10) Patent No.: US 6,512,682 B2
(45) Date of Patent: Jan. 28, 2003

(54) POWER SUPPLY WITH INTERFACE TO DETERMINE POWER REQUIREMENTS OF DEVICES COUPLED THERETO

(75) Inventors: Paul M. Cohen, Beaverton, OR (US); Christopher A. Meredith, Beaverton, OR (US); Ronald J. Child, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/823,730

(22) Filed: Mar. 29, 2001

(65) Prior Publication Data

US 2002/0141217 A1 Oct. 3, 2002

(51) Int. Cl.[7] ................................................. H02M 1/00
(52) U.S. Cl. ....................................................... 363/146
(58) Field of Search ................................. 363/146, 142; 323/282, 283

(56) References Cited

U.S. PATENT DOCUMENTS

| | | | | |
|---|---|---|---|---|
| 5,774,353 A | * | 6/1998 | Wieloch | 363/146 |
| 6,297,982 B1 | * | 10/2001 | Wu | 363/146 |
| 6,301,674 B1 | * | 10/2001 | Saito et al. | 713/340 |
| 6,363,449 B1 | * | 3/2002 | Sides et al. | 710/129 |

* cited by examiner

Primary Examiner—Adolf Deneke Berhane
(74) Attorney, Agent, or Firm—Blakely, Sokoloff, Taylor & Zafman LLP

(57) ABSTRACT

Intelligent power supplies to provide power to electronic devices in a manner the avoids causing a power supply circuit fuse to blow or breaker to trip are disclosed. The power supply circuit includes a power supply control device that determines whether supplying power to an additional electronic device would exceed the capacity of the circuit and cause the fuse to blow or the breaker to trip. The power supply control device communicates with electronic devices via a power control interface to determine the power requirements of the electronic devices. Power is supplied to the devices that can be supplied without causing the fuse to blow or the breaker to trip. Power is not supplied to the devices that would cause the fuse to blow or the breaker to trip.

26 Claims, 4 Drawing Sheets

POWER SUPPLY WITH INTERFACE TO DETERMINE POWER REQUIREMENTS OF DEVICES COUPLED THERETO

FIELD OF THE INVENTION

The invention relates to power supply circuits and interfaces. More particularly, the invention relates to an interface that allows a device supplying power to determine the amount of current required by a device coupled to the power supply.

BACKGROUND

Many electronic systems such as computer systems are coupled to receive power via a surge suppressor or other power supply circuit. A surge suppressor is a device that is coupled to provide alternating current (AC) power to electronic devices and prevents damage to the devices as the result of a voltage transient, or voltage spike. Voltage spikes can cause damage to the electronic devices.

Surge suppressors typically include a fuse or breaker switch that cuts power to all of the electronic devices coupled to the surge suppressor in the event of excessive current. One disadvantage to existing surge suppressors (as well as other power supply circuits) is that the addition of a single electronic device can cause the fuse to blow or the breaker to trip, which cuts power to all electronic device coupled to the surge protector or the power supply circuit. Thus, the addition of a single device can cause multiple other devices to cease operating.

For example, a power supply (with or without surge suppression capability) that is used to provide power to rack mounted server modules can be used to provide power for up to 42 server modules in the case of a typical seven foot 42U rack system. If the power supply is only capable of providing power to 40 servers, the addition of the 41$^{st}$ server will cause a fuse to blow or a breaker to trip, which will cut power to all 41 of the server modules. Thus, the addition of a single server module to a rack system can cause many servers to become unavailable for use.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Intelligent power supplies and related techniques are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Intelligent power supplies to provide power to electronic devices in a manner that avoids causing a power supply circuit fuse to blow or breaker to trip are disclosed. The power supply circuit includes a power supply control device that determines whether supplying power to an additional electronic device would exceed the capacity of the circuit and cause the fuse to blow or the breaker to trip. The power supply control device communicates with electronic devices via a power control interface to determine the power requirements of the electronic devices. Power is supplied to the devices that can be supplied without causing the fuse to blow or the breaker to trip. Power is not supplied to the devices that would cause the fuse to blow or the breaker to trip.

Figure 1:
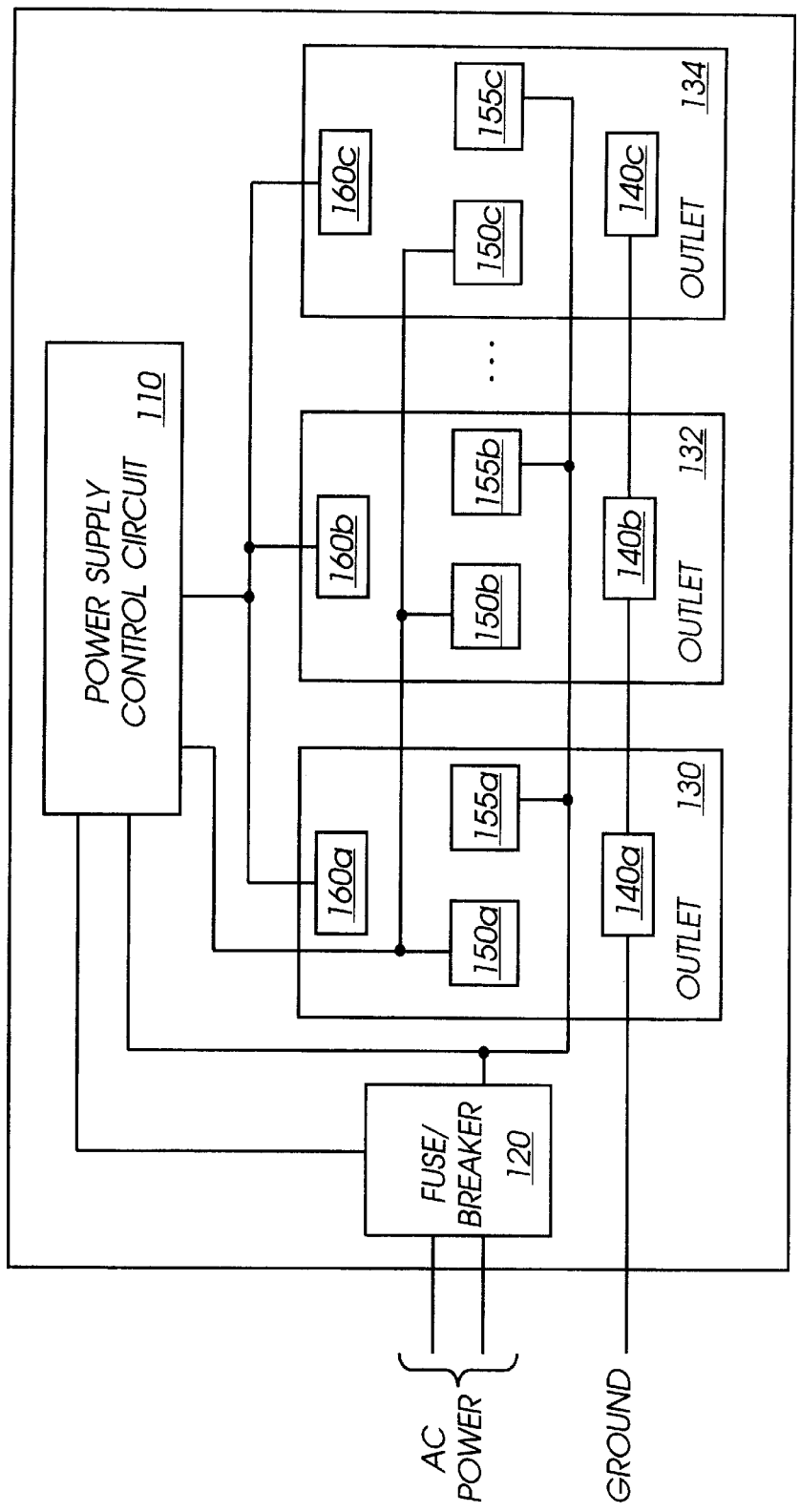
FIG. 1 is a block diagram of one embodiment of a surge suppressor having an interface to negotiate power supply.

FIG. 1 is a block diagram of one embodiment of a surge suppressor having an interface to negotiate power supply. While FIG. 1 illustrates a surge suppressor, the interface described can be used within other power supply configurations. For example, the outlets described with respect to the surge suppressor can also be placed within the walls of a building.

Surge suppressor 100 operates to provide alternating current (AC) power and a ground connection to one or more electronic devices (not shown in FIG. 1) via one or more outlets (e.g., 130, 132, 134). In one embodiment, surge suppressor 100 includes fuse/breaker 120 that operates to protect devices coupled to receive power from surge suppressor 100 from voltage spikes.

AC power and ground connections can be supplied in any manner known in the art. AC power is provided, via two lines, to a pair of connectors (150a and 155a, 150b and 155b, 150c and 155c) for each interface. In one embodiment, AC power is provided by two female connections, which is known in the art. A ground connection is also provided for each outlet (e.g., 140a, 140b, 140c). In one embodiment the ground connection is provided by a female connection.

Power supply control circuit 110 provides control and other functionality to surge suppressor 100. In one embodiment, power control circuit 100 includes a power supply to provide direct current (DC) power to a processor and supporting circuitry (e.g., network interface, memory). Many surge suppressors provide, for example, the ability to send a signal in response to fuse/breaker 120 blowing/ tripping. These and/or other features can be provided by power supply control circuit 110.

In one embodiment, power supply control circuit 110 provides the ability to individually enable and disable outlets 130, 132 and 134. In one embodiment, if the amount of current required by a newly added device would cause fuse/breaker 120 to blow/trip, power supply control circuit 110 disables the outlet to which the newly added device is coupled. This prevents fuse/breaker 120 from blowing/ tripping, which maintains the power supply provided to the devices previously coupled to surge suppressor 100.

In an alternate embodiment, electronic devices have an associated priority. The devices with the highest priorities are provided with power while devices having lower priorities are not provided power, if necessary, to keep fuse/breaker 120 from blowing/tripping. Other power supply schemes can also be supported.

In one embodiment, power supply control circuit 110 is coupled to a power control interface (e.g., 160a, 160b, 160c) though which power supply control circuit can communicate with devices coupled to the respective outlets to determine the power requirements of the devices. In one embodiment, the power control interface is a male connection; however, a female connection or other type of connection can also be used.

In one embodiment, the power control interfaces are Intelligent Platform Management Interface (IPMI) interfaces. IPMI standards have been developed by several corporations including Intel Corporation of Santa Clara, Calif. One embodiment of IPMI is described in Intelligent Platform Management Interface Specification v. 1.5, Document Revision 1.0, Feb. 21, 2001. As an overview, IPMI has been used to monitor server characteristics such as temperature, voltage, fans, whether a power supply is operating and chassis intrusion.

The IPMI standards include a physical interface referred to as the Intelligent Chassis Management Bus (ICMB), one embodiment of which is described in Intelligent Chassis Management Bus Bridge Specification v. 1.0, Document Revision 1.2, May 11, 2000. The ICMB is designed for providing access to common chassis inventory, remote control and status functions under conditions where that information may not be available to be obtained through in-band channels.

ICMB packets consist of a series of eight bit bytes. The ICMB uses standard RS-232 UART character framing, which is described in greater detail in the Telecommunications Industry Association (TIA) document TIA/EIA-232, revision F, published October, 1997. The bus operates at 19.2 kbps with 8-bit characters, one start bit, one stop bit, and no parity. The low-order bit of the character is sent first. Packets are framed in a way that allows the start and end of a packet to be distinguished. Certain characters are used as framing characters and the protocol guarantees that those characters will not appear on the bus except to mark packet boundaries.

ICMB packets can be used by power supply control circuit 110 to communicate with a counterpart power control circuit (not shown in FIG. 1) in a device requesting power. In one embodiment, power supply control circuit 110 provides the counterpart power control circuit with enough power to communicate while the outlet to which the device is coupled does not supply power for the device to operate.

By monitoring the amount of power provided by surge suppressor 100 and communicating with power control circuits of newly coupled devices, power supply control circuit 110 can determine whether providing power to a newly coupled device will cause fuse/breaker 120 to blow/trip. If providing power to the newly coupled device will not cause fuse/breaker 120 to blow/trip, power supply control circuit 110 enables the outlet to which the newly coupled device is coupled to provide power.

In an alternate embodiment, the power control interface is a RS-485 interface. RS-485 is described in greater detail in the TIA document TIA/EIA-485, published March, 1998. RS-485 allows devices to communicate at half-duplex on a single pair of wires and a ground wire. Using RS-485, data is transmitted differentially on a twisted pair link.

In another alternative embodiment. the power control interface is a Universal Serial Bus (USB) interface. One embodiment of USB interfaces is described in Universal Serial Bus Revision 2.0, published October, 2000. Other interfaces, for example, IEEE 1394, or "Firewire" can also be used. The Firewire interface is described in greater detail in IEEE Std. 1394 entitled "High Performance Serial Bus" published June, 1995.

Figure 2A:
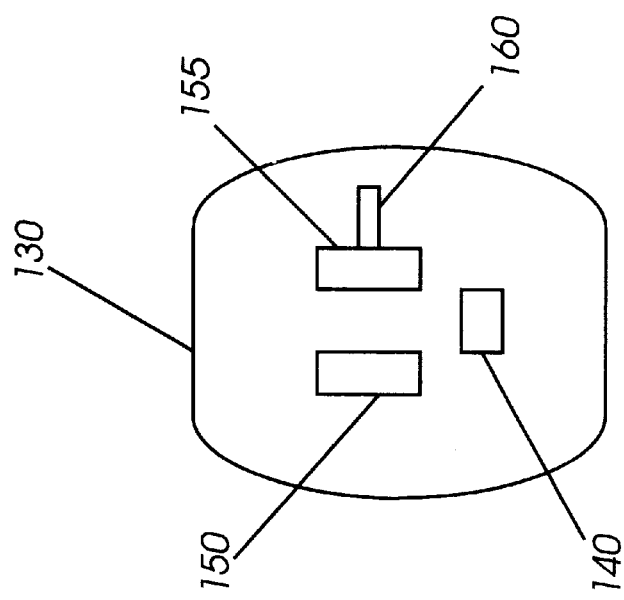
FIG. 2a illustrates one embodiment of a power supply outlet having a power control interface that is a male connector.

FIG. 2a illustrates one embodiment of a power supply outlet having a power control interface that is a male connector. Outlet 130 of FIG. 2a includes a common power supply interface with two female connectors (150 and 155) for AC power and one female connector (140) for ground. Outlet 130 further includes a male power control interface 160. As mentioned above, power control interface 160 can be any type of interface (e.g., ICMB, RS-485, USB, IEEE 1394) that allows a power supply control circuit to communicate with device coupled to outlet 130.

Figure 2B:
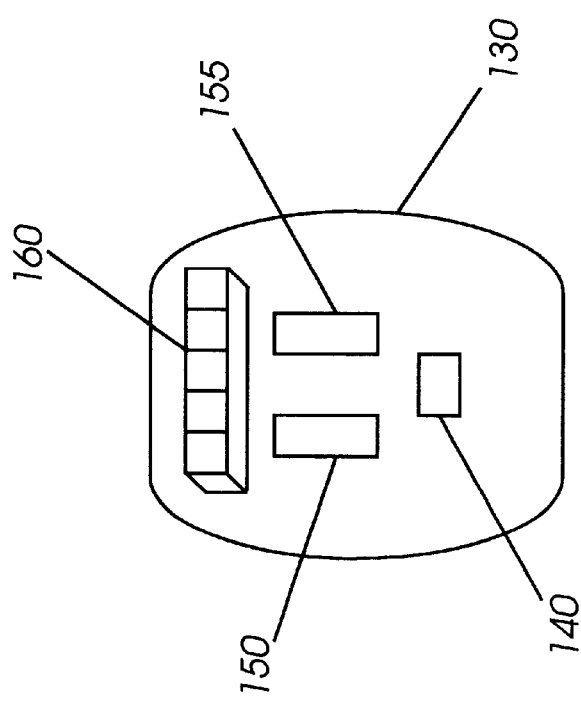
FIG. 2b illustrates one embodiment of a power supply outlet having a power control interface that is a female connector.

FIG. 2b illustrates one embodiment of a power supply outlet having a power control interface that is a female connector. Outlet 130 of FIG. 2b includes a common power supply interface with two female connectors (150 and 155) for AC power and one female connector (140) for ground. Outlet 130 further includes a female power control interface 160.

Figure 3:
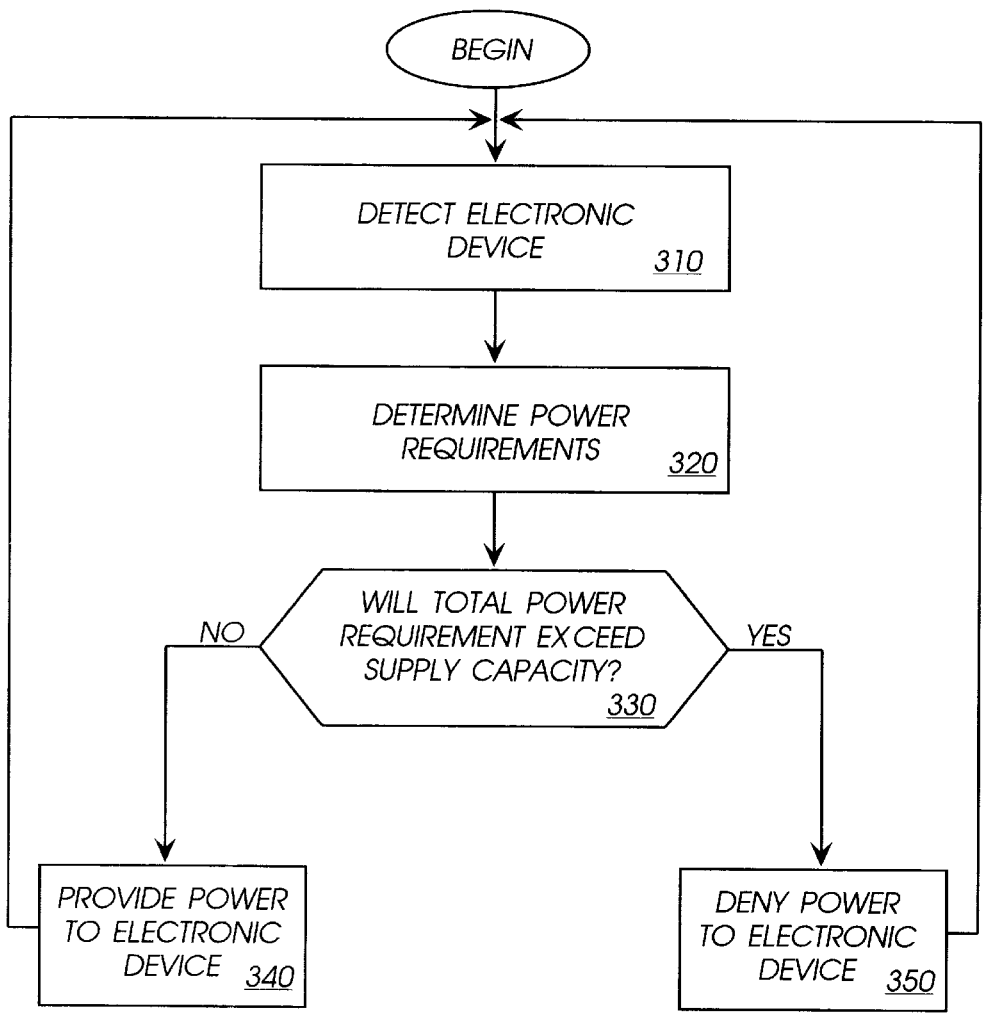
FIG. 3 is a flow diagram of one embodiment of a technique for providing power to an electronic device based on the requirements of the electronic device and power supply capacity.

FIG. 3 is a flow diagram of one embodiment of a technique for providing power to an electronic device based on the requirements of the electronic device and power supply capacity.

An electronic device is detected at an outlet at 310. In one embodiment, a power supply control circuit periodically polls outlets coupled to a power supply circuit to determine whether an electronic device is coupled to one or more of the outlets. The type of message that is used to determine whether an electronic device is coupled to an outlet depends on the protocol used for the power control interface. In general, the power supply control circuit send some type of message that requests a response. The response can be used to determine whether an electronic device is coupled to the outlet.

The power requirements of the electronic device are determined at 320. In one embodiment, the power supply control circuit communicates with a power control circuit of the electronic device to determine the peak current requirement of the electronic device. Based on the current requirement and the voltage supplied by the power supply circuit, the power supply control circuit can determine the peak power requirement of the electronic device.

Using either the peak power requirement or the peak current requirement, the power supply control circuit can determine whether the additional power provided to the electronic device could exceed the capacity of the power supply circuit at 330. If the additional power provided to the electronic device does not exceed the power supply capacity at 330, the power is provided at 340. If the additional power provided to the electronic device does exceed the power supply capacity at 330, the power is not provided at 350.

Figure 4:
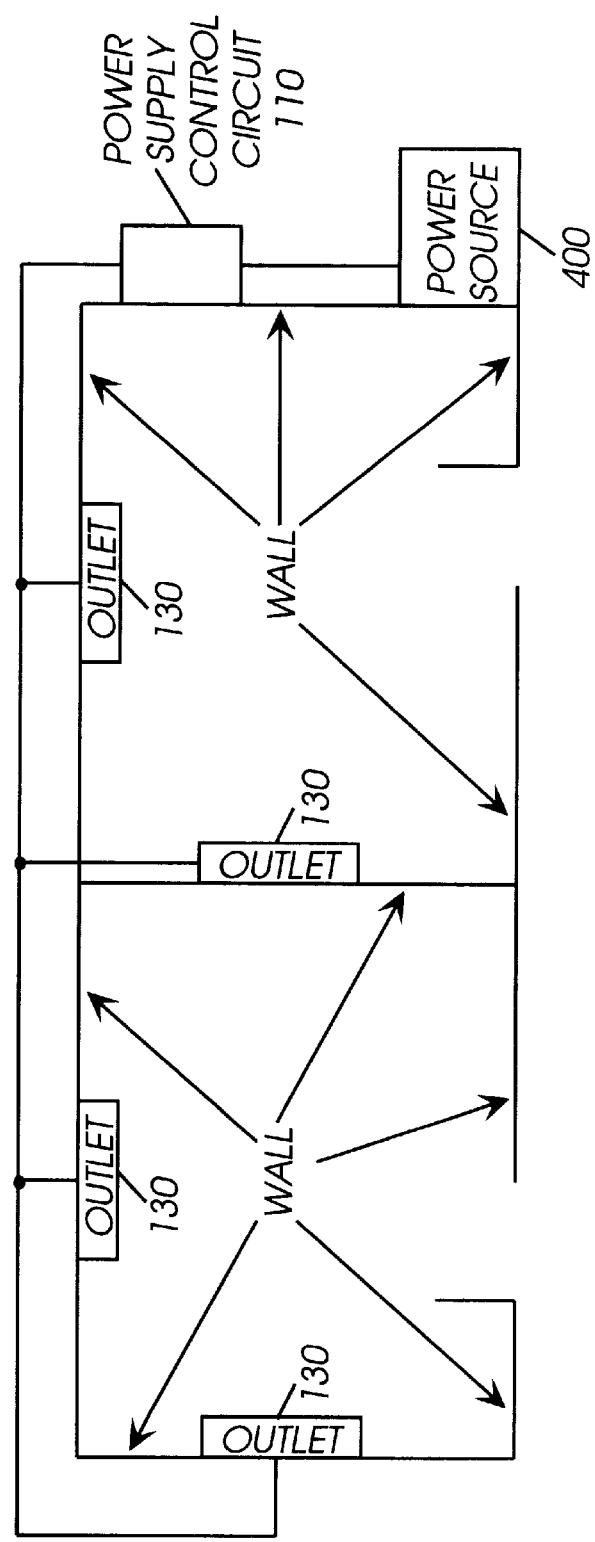
FIG. 4 illustrates one embodiment of a power supply circuit having outlets within walls of a building.

FIG. 4 illustrates one embodiment of a power supply circuit having outlets within walls of a building. The components of the power supply circuit are the same or similar to the surge suppressor described above except that the outlets are disposed within the walls of a building rather than within a surge suppressor housing. Power source 400 can be, for example, a power service breaker box or any other device for providing power to a building.

In the foregoing specification, the invention has been described with reference to specific embodiments thereof. It will, however, be evident that various modifications and changes can be made thereto without departing from the broader spirit and scope of the invention. The specification and drawings arc, accordingly, to be regarded in an illustrative rather than a restrictive sense.

What is claimed is:

1. A power supply having a control circuit, the power supply to provide electrical current up to a predetermined amperage, the power supply comprising one or more outlets coupled with the control circuit, the one or more outlets to supply power to devices coupled to the outlets, at least one of the outlets having a first wired interface to provide a pair of power lines to provide alternating current (AC) power and a ground line, and a second wired interface to provide a control interface coupled with the control circuit, wherein the first wired interface and the second wired interface are mutually exclusive, the control interface to allow the control circuit to communicate with devices coupled with the respective outlets to determine the current requirements of the devices, the control circuit to control an amount of current supplied by the power supply by selectively denying power to a device coupled to one or more of the outlets, if the amount of current required would exceed the predetermined amperage.

2. The power supply of claim 1 wherein the control interface comprises a Universal Serial Bus (USB) interface.

3. The power supply of claim 1 wherein the control interface comprises an Intelligent Platform Management Interface (IPMI) interface.

4. The power supply of claim 1 wherein the control interface comprises a RS-485 interface.

5. The power supply of claim 1 wherein the outlets further comprise:
- a pair of female connectors coupled to the pair of power lines;
- a female connector coupled to the ground line; and
- a male connector coupled to the control interface.

6. The power supply of claim 1 wherein the outlets further comprise:
- a pair of female connectors coupled to the pair of power lines;
- a female connector coupled to the ground line; and
- a female connector coupled to the control interface.

7. The power supply of claim 1 wherein the control interface comprises an IEEE-1394 interface.

8. A power outlet to provide electrical current up to a predetermined amperage, the outlet having a first wired interface with a pair of power lines to provide alternating current (AC) power and a ground line, the outlet also having a second wired interface with control lines coupled with a control circuit, the control circuit to control an amount of current supplied by the power outlet by denying power to a device coupled the outlet if the device requires current that would exceed the predetermined amperage.

9. The power outlet of claim 8 wherein the control interface comprises a Universal Serial Bus (USB) interface.

10. The power outlet of claim 8 wherein the control interface comprises an Intelligent Platform Management Interface (IPMI) interface.

11. The power outlet of claim 8 wherein the control interface comprises a RS-485 interface.

12. The power outlet of claim 8 further comprising:
- a pair of female connectors coupled to the pair of power lines;
- a female connector coupled to the ground line; and
- a male connector coupled to the control interface.

13. The power outlet of claim 8 further comprising:
- a pair of female connectors coupled to the pair of power lines;
- a female connector coupled to the ground line; and
- a female connector coupled to the control interface.

14. The power outlet of claim 8 wherein the control interface comprises an IEEE-1394 interface.

15. A power supply circuit to provide electrical current up to a predetermined amperage, the power supply circuit comprising one or more outlets disposed within one or more walls of a structure, the power supply circuit to supply power to devices coupled to the one or more outlets, at least one of the outlets having a first wired interface with a pair of power lines to provide alternating current (AC) power and a ground line and a second wired interface to provide a control interface, the first wired interface and the second wired interface being mutually exclusive, the control interface to allow the control circuit to communicate with devices coupled with the respective outlets to determine the current requirements of the devices, the control circuit to control an amount of current supplied by the power supply by denying power to a device coupled to one of the outlets, if the device requires sufficient current that, in combination with other devices coupled to other outlets, if any, the amount of current required would exceed the predetermined amperage.

16. The power supply circuit of claim 15 wherein the control interface comprises a Universal Serial Bus (USB) interface.

17. The power supply circuit of claim 15 wherein the control interface comprises an Intelligent Platform Management Interface (IPMI) interface.

18. The power supply circuit of claim 15 wherein the control interface comprises a RS-485 interface.

19. The power supply circuit of claim 15 wherein the outlets further comprise:
- a pair of female connectors coupled to the pair of power lines;
- a female connector coupled to the ground line; and
- a male connector coupled to the control interface.

20. The power supply circuit of claim 15 wherein the outlets further comprise:
- a pair of female connectors coupled to the pair of power lines;
- a female connector coupled to the ground line; and
- a female connector coupled to the control interface.

21. The power supply circuit of claim 15 wherein the control interface comprises an IEEE-1394 interface.

22. A method comprising:
- receiving, via a control interface within a power outlet, an indication of an amount of current required by a device coupled to the power outlet, wherein the control interface is independent of a ground and a pair of alternating current (AC) power lines used to provide power to the device; and
- providing power from a power supply circuit to the device via the power outlet, if the amount of current required by the device does not cause the power supply circuit to exceed a predetermined amperage.

23. The method of claim 22 wherein the control interface comprises a Universal Serial Bus (USB) interface.

24. The method of claim 22 wherein the control interface comprises an Intelligent Platform Management Interface (IPMI) interface.

25. The method of claim 22 wherein the control interface comprises a RS-485 interface.

26. The method of claim 22 wherein the control interface comprises an IEEE-1394 interface.

* * * * *

UNITED STATES PATENT AND TRADEMARK OFFICE
CERTIFICATE OF CORRECTION

PATENT NO.    : 6,512,682 B2
DATED         : January 28, 2003
INVENTOR(S)   : Cohen et al.

It is certified that error appears in the above-identified patent and that said Letters Patent is hereby corrected as shown below:

<u>Column 4,</u>
Line 66, detele "arc", insert -- are --.

Signed and Sealed this

Fifth Day of August, 2003

JAMES E. ROGAN
*Director of the United States Patent and Trademark Office*